April 16, 1957 D. W. ALEXANDER 2,788,592

TELEPHONE NUMBER REFERENCE

Filed June 13, 1955

*INVENTOR.*
DAVID W. ALEXANDER

*BY*

ATTORNEY

United States Patent Office 2,788,592

Patented Apr. 16, 1957

2,788,592

TELEPHONE NUMBER REFERENCE

David W. Alexander, Portland, Oreg.

Application June 13, 1955, Serial No. 514,931

1 Claim. (Cl. 40—10.5)

The present invention relates to a telephone number reference, and more particularly, to such a reference which is attachable to the handset of a telephone.

The primary object of the invention is to provide a construction including a revolvable element carrying names and telephone numbers which is supported on and covered by a second member having a window therein through which the numbers may be observed.

Another object of the invention is to provide a device of the character described where the numbers are mounted on a removable strip of paper which can be replaced from time to time when new numbers are to be added and old numbers removed from the device or when numbers are changed.

A further object of the invention is to provide a telephone reference device that can be attached to the transmitter or receiver of a telephone without altering the construction of the telephone equipment in any way.

A still further object of the invention is to provide a structure of the type described which is sufficiently noncomplicated in construction to permit the average unskilled user to attach the device to the telephone.

Another object of the invention is to provide a device of the character described which adds very little weight to the overall weight of the handset so that no additional tiring will result from the use of the device.

Further objects and advantages will become apparent in the following specification when read in the light of the attached drawing, in which.

Figure 1:
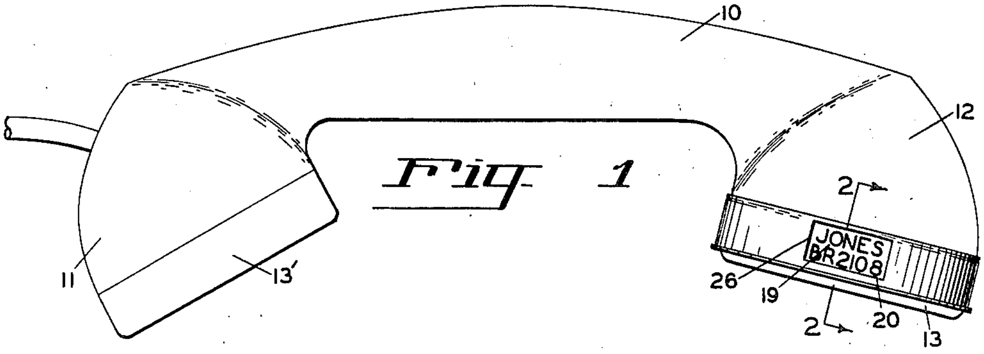
Figure 1 is a side view of a telephone handset showing the device mounted through the receiver end thereof.

Referring now to the drawing, wherein like reference numerals indicate like parts throughout the several figures, the reference numeral 10 indicates generally a telephone handset of conventional construction. The handset is provided with a transmitter 11 at one end thereof and a receiver 12 on the other end thereof. A cover plate 13 is secured to the receiver 12 by means of threads 14 formed thereon. The cover plate 13 is provided with internal threads 16 for cooperation with the threads 14 on the receiver 12. The transmitter 11 is provided with a similar cover plate 13′ and it should be understood that applicant's attachment may be positioned either under the cover plate 13 or the cover plate 13′.

The attachment for the telephone 10 consists primarily of a ring 17 which is provided at one end with an outwardly turned flange 18. A number carrying flexible strip 19 formed of paper or the like is glued to the outer surface of the ring 17 by any desired medium. Names and telephone numbers 20 are printed on this strip by any suitable means. The side of the strip 19 opposite the telephone numbers 20 carries an adhesive 21, which when moistened and applied to the outer surface of the ring 17 will glue the strip 19 thereto.

Figures 2, 3, 4, 5, 6:
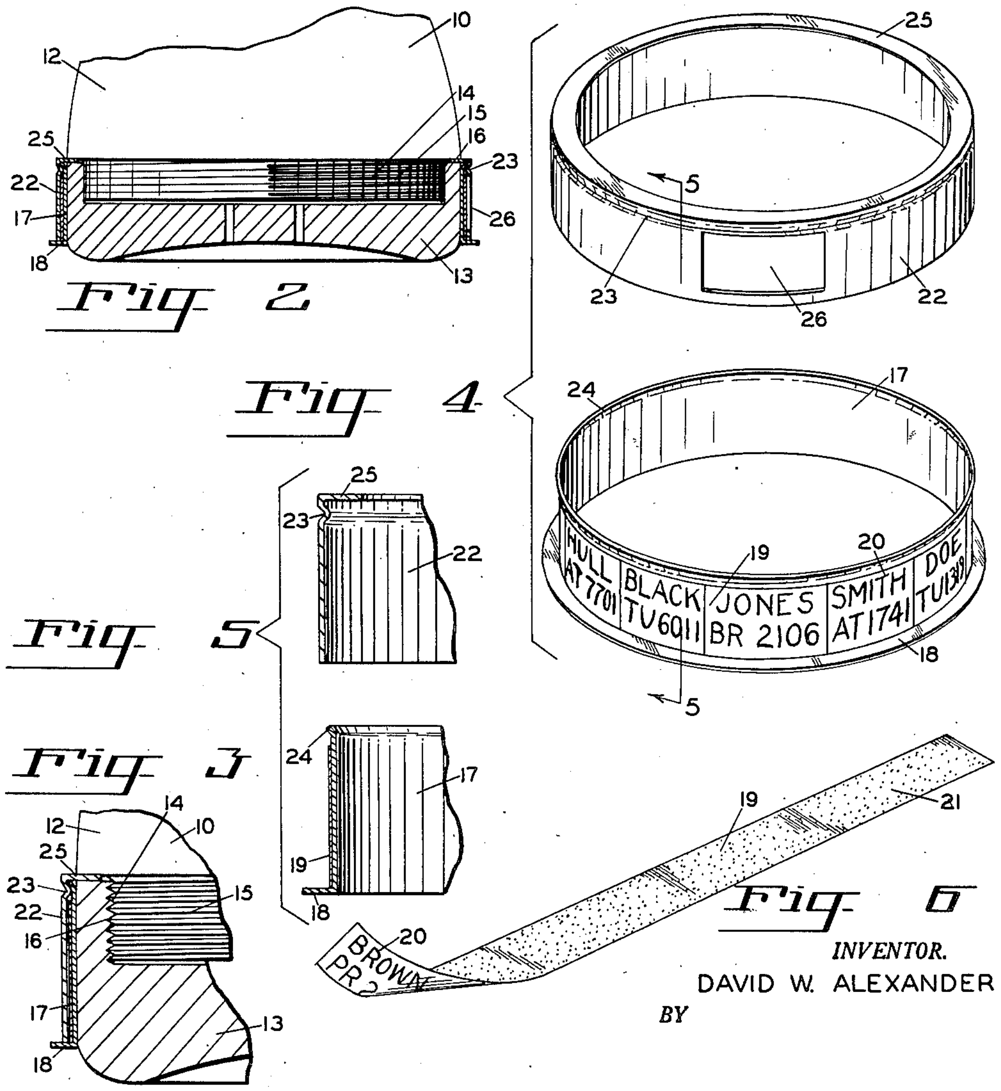
Figure 2 is a side elevation of the telephone handset with the receiver cover plate and the invention shown in section for clarity, the sectional portions of Figure 2 are taken approximately along the line 2—2 of Figure 1, looking in the direction of the arrows.
Figure 3 is an enlarged fragmentary sectional view of the mechanism illustrated in Figure 2.
Figure 4 is an exploded perspective of the dial supporting ring and dial cover ring.
Figure 5 is an exploded fragmentary sectional view of the rings shown in Figure 4, taken along the line 5—5 of Figure 4, looking in the direction of the arrows.
Figure 6 is a perspective view of the dial strip laid flat and partially turned up at one of its ends for convenience of illustration.

A dial cover ring 22 is mounted adjacent the outer surface of the ring 17 and the dial strip 19 with sufficient clearance therebetween to permit the ring 17 to be revolved under the cover ring 22. The ring 17 is held within the cover ring 22 by means of an annular rib 23 formed adjacent one end thereof. An annular tongue 24 is formed on the inner edge of the ring 17 opposite to the flange 18, the tongue 24 being engageable over the rib 23 to maintain the ring 17 and the ring 22 in contact with each other, as illustrated in Figure 3. The ring 22 is provided on the end adjacent the rib 23 with an inwardly extending annular flange 25. An opening 26 is also located in the ring 22 and it should be noted that the numbers 20 on the dial strip 19 can be read therethrough as the strip is rotated thereunder.

In assembling the device, the dial strip 19 is applied to the dial ring 17 then the dial ring 17 is inserted within the cover ring 22 with the annular tongue 24 snapped over the annular rib 23 to maintain the parts together.

In installing the invention, the plate 13 or 13′ is removed from the handset 10 permitting the flange 25 of the cover ring 22 to be applied over the threaded portion 15 of the handset 10. Next the cover plate 13 will be replaced onto the threaded extension 15 as best illustrated in Figures 1, 2 and 3, clamping the flange 25 between the cover plate 13 or 13′ and the handset preventing the cover plate from turning and holding the assembled unit to the telephone.

In operation, by grasping the outwardly extending flange 18 of the dial ring 17 it can be rotated within the cover plate 22 permitting the desired name and telephone number 20 to be read through the window 26.

Having thus described the preferred embodiment of the invention, it should be understood that numerous modifications and structural adaptations may be resorted to without departing from the scope of the appended claim.

What is claimed is:

A telephone number reference attachment for a telephone handset of the type having a removable cover plate thereon comprising an annular ring, a radial flange secured to one end of said ring and extending outwardly therefrom, means on said ring carrying indicia, a second annular ring having an inwardly directed annular flange formed on one end thereof, said second annular ring having an indicia viewing opening formed therein, and means on said ring for rotatably supporting said first annular ring within said second annular ring, said flange on said second annular ring being adapted to be clamped between the cover plate and the handset of a telephone, said outwardly extending radial flange formed on one end of said first ring provides means whereby said first ring may be rotated to change the indicia appearing in said window.

References Cited in the file of this patent

UNITED STATES PATENTS

| | | |
|---|---|---|
| 731,805 | Mc Kee | June 23, 1903 |
| 775,921 | Hile | Nov. 29, 1904 |
| 1,251,838 | Sykes | Jan. 1, 1918 |
| 1,332,604 | Chester | Mar. 2, 1920 |
| 1,466,286 | Hearn | Aug. 28, 1923 |